(12) United States Patent
Keefe et al.

(10) Patent No.: US 12,162,314 B2
(45) Date of Patent: Dec. 10, 2024

(54) TRUCK TIRE TREAD WITH ANGLED RIBS HAVING STONE EJECTORS

(71) Applicants: Brian Joseph Keefe, Simpsonville, SC (US); Nicholas Mailhiot, Simpsonville, SC (US); Virgile Ayglon, Simpsonville, SC (US); Compagnie Generale des Etablissements Michelin, Clermont-Ferrand (FR)

(72) Inventors: Brian Joseph Keefe, Simpsonville, SC (US); Nicholas Mailhiot, Simpsonville, SC (US); Virgile Ayglon, Simpsonville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 864 days.

(21) Appl. No.: 17/275,480

(22) PCT Filed: Nov. 12, 2019

(86) PCT No.: PCT/US2019/060911
§ 371 (c)(1),
(2) Date: Mar. 11, 2021

(87) PCT Pub. No.: WO2020/102190
PCT Pub. Date: May 22, 2020

(65) Prior Publication Data
US 2022/0118800 A1   Apr. 21, 2022

Related U.S. Application Data

(60) Provisional application No. 62/767,658, filed on Nov. 15, 2018.

(51) Int. Cl.
*B60C 11/12* (2006.01)
*B60C 11/03* (2006.01)
*B60C 11/13* (2006.01)

(52) U.S. Cl.
CPC ...... *B60C 11/1353* (2013.01); *B60C 11/0302* (2013.01); *B60C 11/1236* (2013.01);
(Continued)

(58) Field of Classification Search
CPC ............ B60C 11/0302; B60C 11/1323; B60C 11/1236; B60C 2011/1338
See application file for complete search history.

(56) References Cited

U.S. PATENT DOCUMENTS 2,104,532 A * 1/1938 Sommer ............ B60C 11/0311
152/DIG. 3
4,832,099 A * 5/1989 Matsumoto ........... B60C 11/033
152/209.28
(Continued)

FOREIGN PATENT DOCUMENTS

DE  102017203225 A1   8/2018
EP        227322 A2 *  7/1987
(Continued)

OTHER PUBLICATIONS

Machine translation for Japan 04-201608 (Year: 2024).*
European Patent Office; International Search Report and Written Opinion for patent application PCT/US2019/060911, filed Nov. 12, 2019; Publisher: European Patent Office, Rijswijk, Netherlands; Jun. 5, 2020; pp. 1-13, enclosed.

*Primary Examiner* — Steven D Maki
(74) *Attorney, Agent, or Firm* — Neal P. Pierotti (57) ABSTRACT

A heavy truck tire tread (12) is provided that has a tread groove (14) that is not oriented completely in the longitudinal direction so as to extend in both the longitudinal direction and the lateral direction. The tread groove is at least partially defined by a leading edge wall and a trailing edge wall and a bottom surface. A stone ejector (24) engages
(Continued)

either the leading edge wall or the trailing edge wall but not both the leading edge wall and the trailing edge wall. The stone ejector faces the non-engaged leading edge wall or the trailing edge wall. Also, the tread has an average void depth that does not go past a twenty percent line (36). The twenty percent line (36) is twenty percent of a full void depth (40) located from the outer surface of the tread, and the average void depth does not include decouple grooves and tread outboard from them.

17 Claims, 10 Drawing Sheets

(52) U.S. Cl.
CPC ....... *B60C 11/1323* (2013.01); *B60C 11/1204* (2013.01); *B60C 2011/1213* (2013.01); *B60C 2011/1338* (2013.01); *B60C 2011/1361* (2013.01); *B60C 2200/06* (2013.01)

(56) References Cited

U.S. PATENT DOCUMENTS

| | | | |
|---|---|---|---|
| D426,855 S * | 6/2000 | Niwa | D12/563 |
| 2010/0258228 A1* | 10/2010 | De Benedittis | B60C 11/047 152/209.21 |
| 2015/0020940 A1* | 1/2015 | Yasunaga | B60C 11/0302 152/209.24 |
| 2017/0157990 A1* | 6/2017 | Bortolet | B60C 11/11 |
| 2019/0176539 A1* | 6/2019 | Yasunaga | B60C 11/032 |

FOREIGN PATENT DOCUMENTS

| | | | |
|---|---|---|---|
| EP | 688685 A2 * | 12/1995 | |
| EP | 3178669 A1 | 6/2017 | |
| GB | 2224472 A * | 5/1990 | |
| JP | 04-201608 A * | 7/1992 | |
| WO | 2009082394 A1 | 7/2009 | |
| WO | 2017116706 A1 | 7/2017 | |

\* cited by examiner

TRUCK TIRE TREAD WITH ANGLED RIBS HAVING STONE EJECTORS

CROSS-REFERENCE TO RELATED APPLICATIONS

The present application is a 35 U.S.C. § 371 application of PCT/US19/60911 filed on Nov. 12, 2019 and entitled "Truck Tire Tread with Angled Ribs Having Stone Ejectors." PCT/US19/60911 claims priority to U.S. Patent Application No. 62/767,658 filed on Nov. 15, 2018 and entitled "Truck Tire Tread with Angled Ribs Having Stone Ejectors." PCT/US19/60911 and U.S. 62/767,658 are incorporated by reference herein in their entireties for all purposes.

FIELD OF THE INVENTION

The subject matter of the present invention relates to a truck tire that has reduced abnormal tread wear. More particularly, the present application involves a truck tire tread that features an angled rib with stone ejectors in tread grooves on one side of the tread grooves.

BACKGROUND OF THE INVENTION

Manufacturers of heavy commercial vehicle tires have made huge progress in developing tire architectures and tire materials that allow them to increase the wear resistance of tire treads and reduce the rolling resistance of tires while at the same time improving their level of grip and resistance to road hazard. Tread patterns may include a series of circumferential grooves between which a series of circumferential ribs are positioned. The circumferential direction, which can also be described as the longitudinal direction, extends around the central axis of the tire and is oriented at a ninety degree angle to the lateral direction of the tire. The circumferential grooves and ribs extend 360 degrees around the tire and are oriented so that they have a component of extension in the longitudinal/circumferential direction but no component of extension in the lateral direction. A variation of tread patterns involves orienting the ribs and grooves so that they are not circumferential ribs and grooves, but rather include a component of extension in the lateral direction. In this regard, the tread grooves and ribs can extend from the shoulder edges inward in the lateral direction while at the same time extending some amount in the longitudinal direction to result in an "angled" orientation of these tread features.

The use of angled ribs and grooves achieves some advantages over tread designs that include only circumferential grooves and ribs. Designs with angled grooves and ribs introduce directionality into the tire. The use of angled ribs and grooves has been shown to prevent the retention of stones within the tread grooves and to subsequently reduce stone drilling, which is the pushing of the stone into the rubber of the tread. It is known to provide stone ejectors within tread grooves that function to reduce penetration of pointed and sharp rocks caught in the tread and thus reduce stone drilling. However, the use of angled grooves and ribs may result in kick-out stresses that could wear down the tread. As the combination of angled grooves and ribs and stone ejectors is not common, variation and improvement within the art is desired to optimize the performance of the stone ejectors within the tread grooves and potentially to minimize kick-out stresses on the tread.

Brief Description of the Drawings

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for a tread 12 for a heavy duty truck tire 10 that has a tread groove 14 that is not oriented completely in a longitudinal direction 26 or a lateral direction 28. A stone ejector 24 is in the tread groove 14 and engages either a leading edge wall 18 of the tread groove 14 or a trailing edge wall 20 of the tread groove 14, but not both. The stone ejector 24 faces the wall 18 or 20 to which it is not engaged. The arrangement of stone ejectors 24 in high angled tread groove 14 imparts traction to the tread 12 and minimizes block kick-out stresses, and provides protection against stone drilling and reduces irregular wear of the tread 12.

Figure 1:
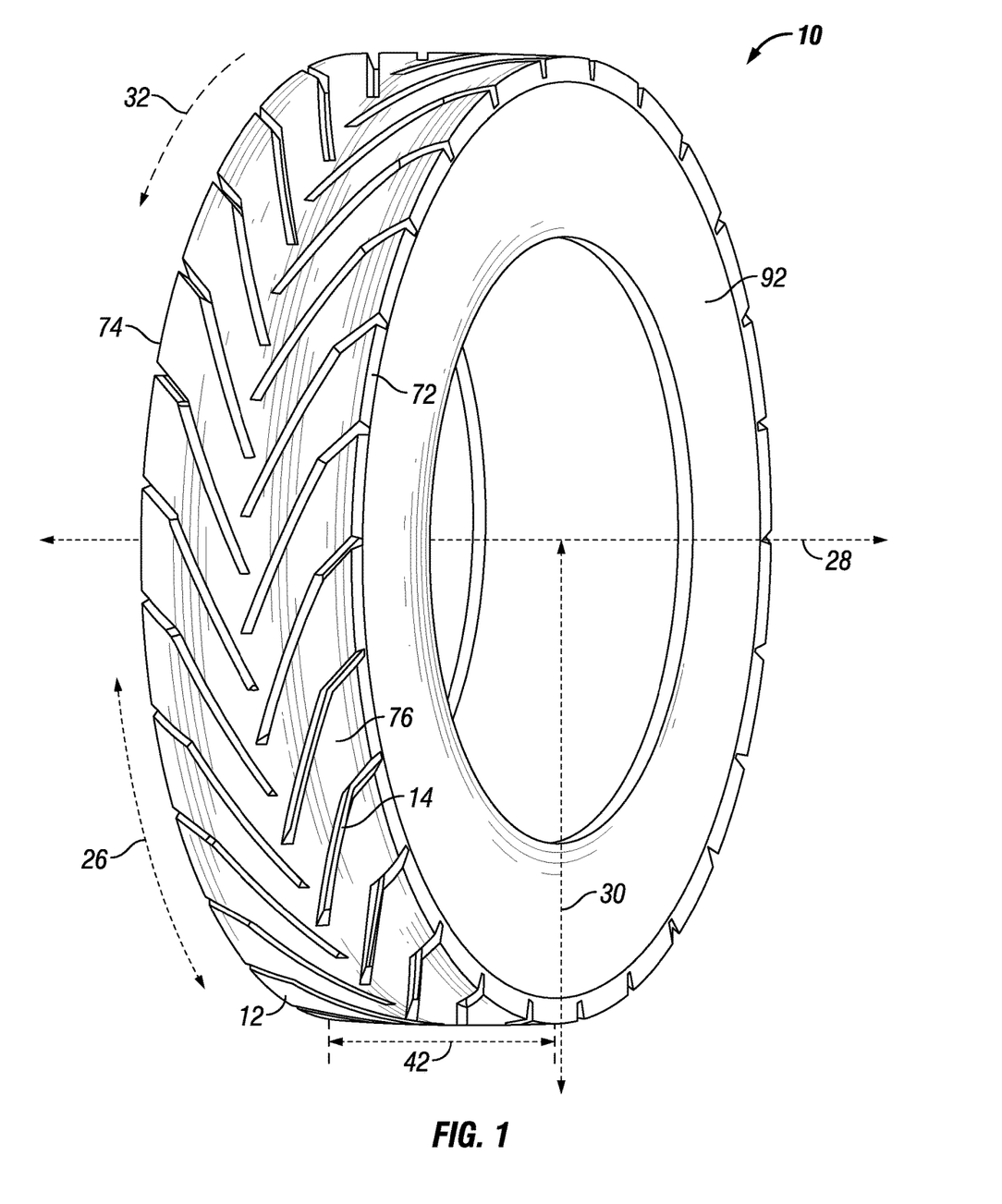
FIG. 1 is a perspective view of a heavy truck tire.

FIG. 1 shows a tire 10 that is a heavy duty truck tire 10. In this regard, the tire 10 is not designed for nor used with a car, motorcycle, or light truck (payload capacity less than 4,000 pounds), but is instead designed for and used with heavy duty trucks such as 18 wheelers, garbage trucks, or box trucks. The tire 10 may be a steer tire, a drive tire, a trailer tire, or an all position tire. The tire 10 includes a casing 92 onto which a tread 12 is disposed thereon. The tread 12 can be manufactured with the casing 92 and formed as a new tire 10, or the tread 12 can be a retread band that is attached to the casing 92 at some point after the casing 92 has already been used to form a retreaded tire 10. This is the case with all of the designs shown and described herein. They may all be tread designs of a brand new tire 10, or may be tread designs of a tread 12 for use in a retread tire 10. The central axis of the tire 10 extends through the center of the casing 92, and the lateral direction 28 of the tire 10 is parallel to the central axis. The radial direction 30, referred to also as the thickness direction 30, of the tire 10 is perpendicular to the central axis and the tread 12 is located farther from the central axis in the thickness direction 30 than the casing 92. The tread 12 extends all the way around the casing 92 in the circumferential direction 26, also referred to as the longitudinal direction 26, of the tire 10 and circles the central axis 360 degrees. The tread 12 includes a series of grooves and ribs that form a tread pattern. A rolling tread width 42 extends in the lateral direction 28 from one shoulder edge 72 of the tread 12, or an opposite shoulder edge 74 of the tread 12. The rolling tread width 42 represents that portion of the tread 12 that engages the ground through normal operation of the tire 10, and the shoulder edges 72, 74 may engage the ground as well as the area between these locations in the lateral direction 28.

Figure 2:
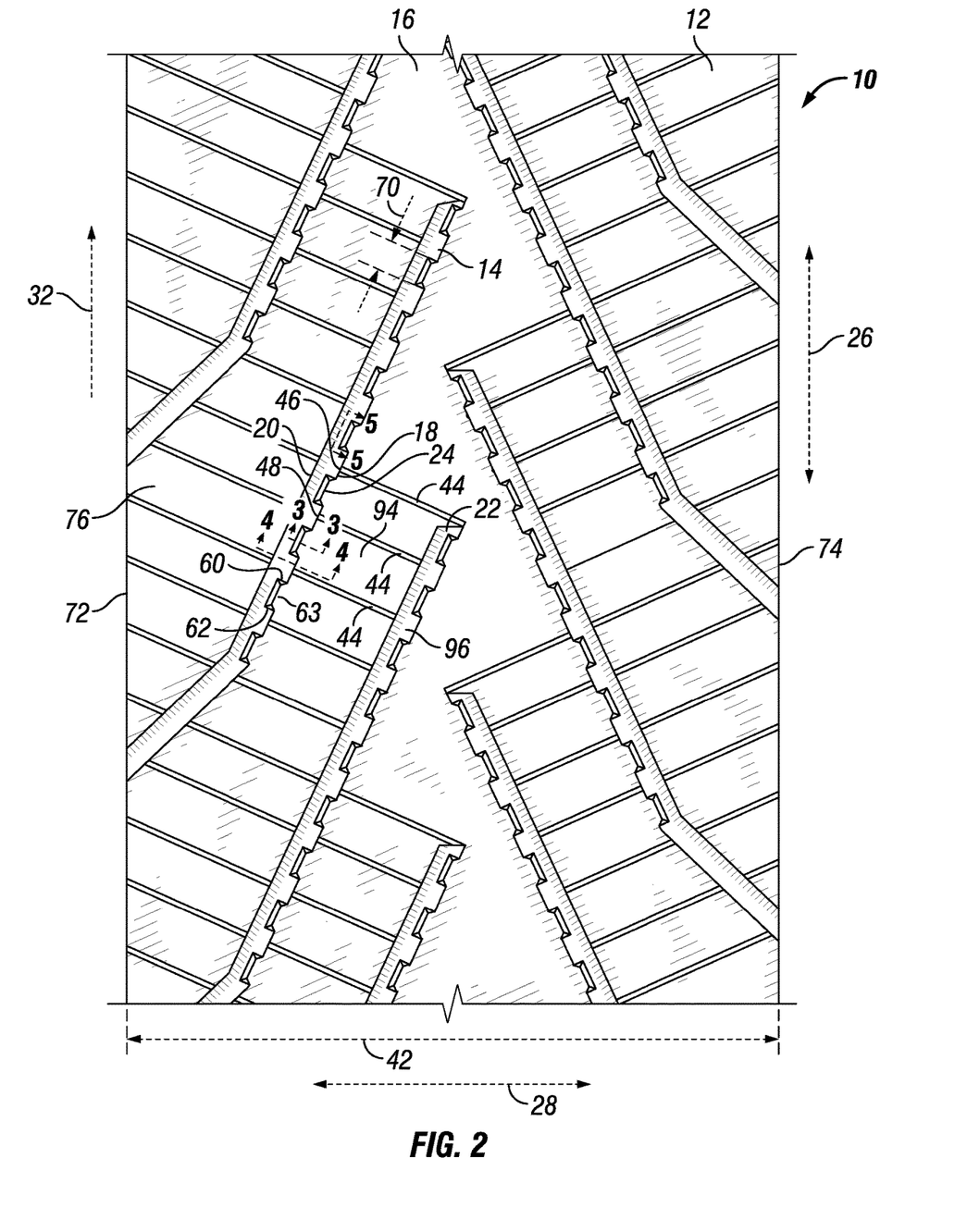
FIG. 2 is top view of tread in accordance with one exemplary embodiment.
Figure 3:
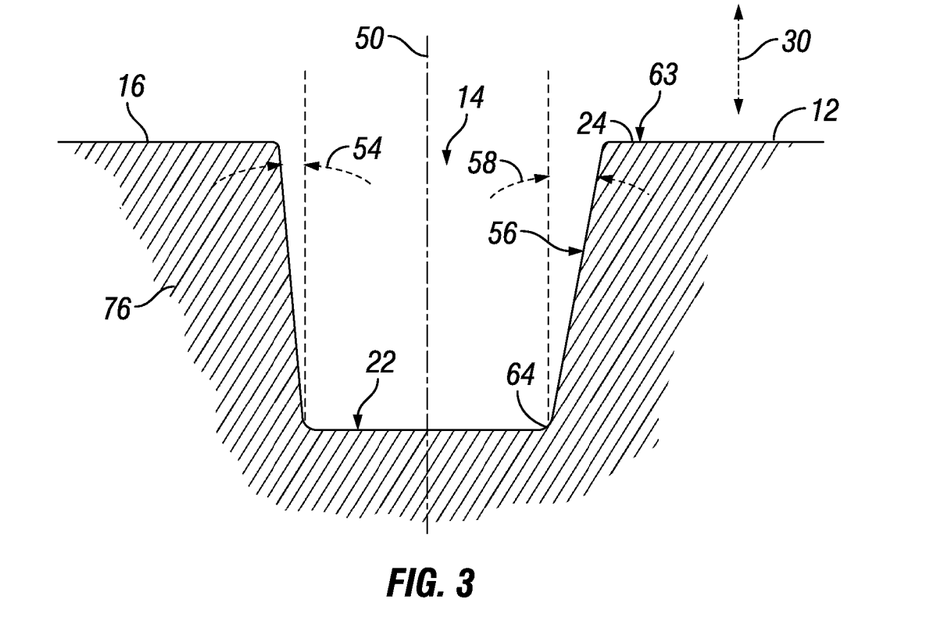
FIG. 3 is cross-sectional view taken along line 3-3 in FIG. 2.
Figure 4:
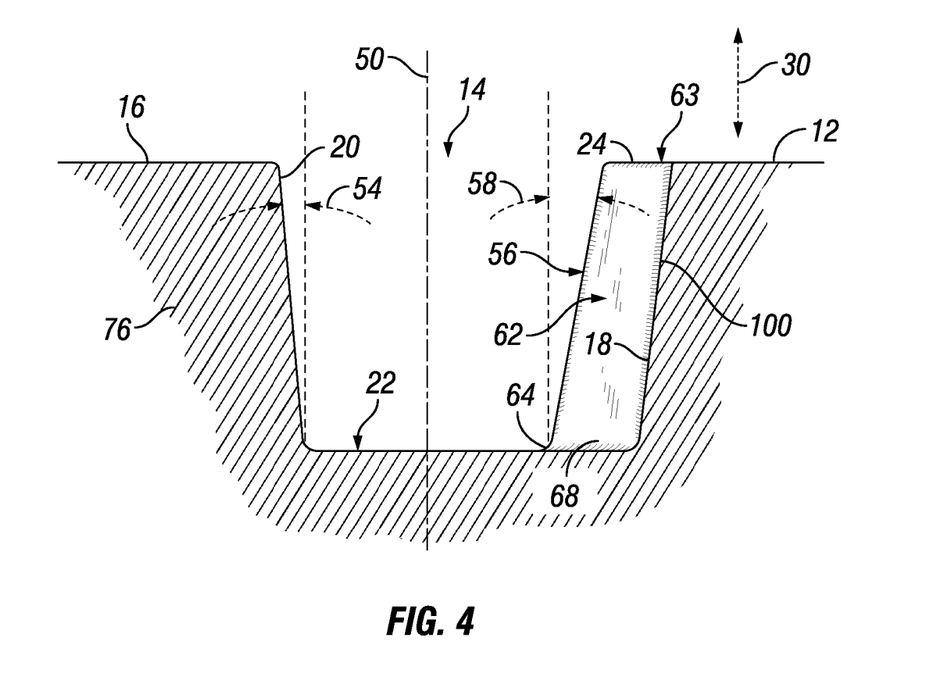
FIG. 4 is a cross-sectional view taken along line 4-4 in FIG. 2.
Figure 5:
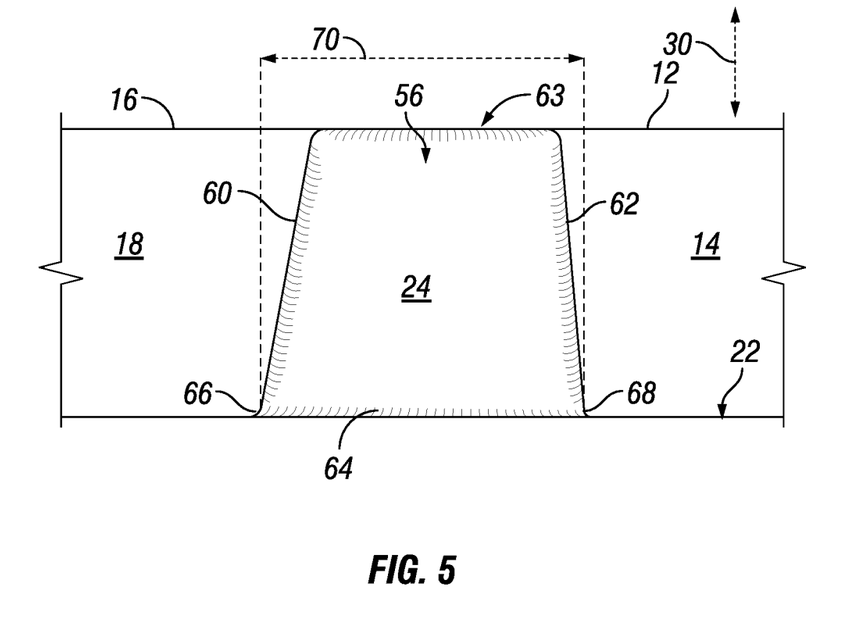
FIG. 5 is a cross-sectional view taken along line 5-5 in FIG. 2.
Figure 6:
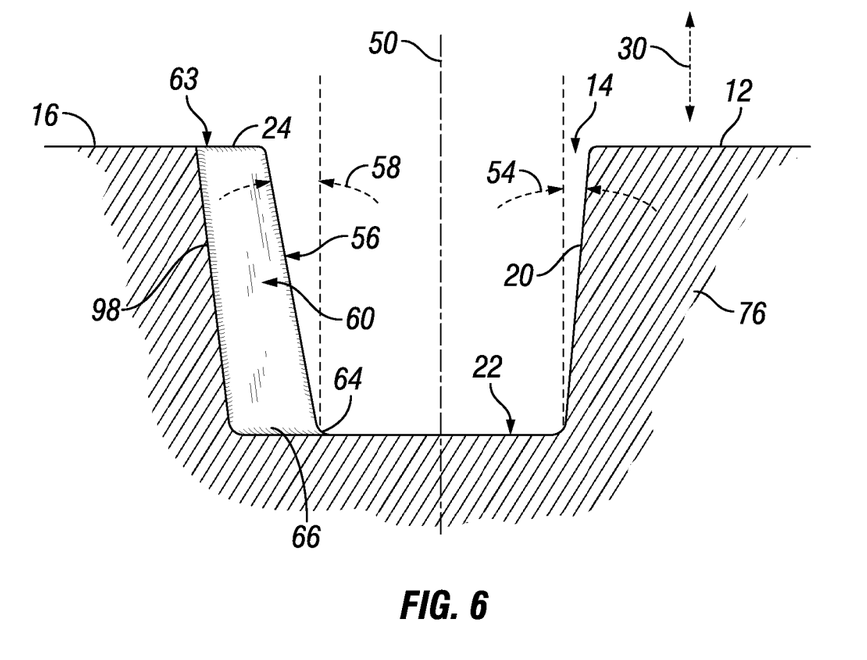
FIG. 6 is a cross-sectional view taken along line 6-6 in FIG. 2.

FIG. 2 is a top view of a tread 12 that can be part of a tire 10 or a retread band that is produced and subsequently attached to a casing 92 to form a retread tire 10. The same tread pattern can repeat throughout the entire longitudinal length of the tread 12. The tread 12 has a tread groove 14 and additional tread grooves that are in sequence next to one another in the longitudinal direction 26. The tread grooves 14 can be variously shaped and have widths that can be greater than 2 millimeters. The shape of the center portion of the tread grooves 14 can be different than the shape of the shoulder portion of the tread grooves 14. A rib 76 is defined between the tread grooves in the longitudinal direction 26. The rib 76 is not a circumferential rib in that it does not extend all the way around the tread 12 in the longitudinal direction 26. Instead, the rib 76 extends from the shoulder edge 72 to the center of the tread 12. The rib 76 is angled relative to the longitudinal direction 26 so that the rib 76 extends so as to have a component of extension in both the longitudinal direction 26 and in the lateral direction 28. In contrast, a circumferential rib would have a component of extension in the longitudinal direction 26 and no component of extension in the lateral direction 28.

The tread grooves 14 are likewise not circumferential grooves in that they extend so as to have a component of extension in both the longitudinal direction 26 and the lateral direction 28. The tread grooves 14 may extend from the shoulder edge 72 and terminate at some point at or near the center of the tread 12. In other embodiments, the tread grooves 14 and ribs 76 need not start at the shoulder edges 72, 74 and/or need not extend to the center. The tread grooves 14 may engage other grooves of the tread 12, and the ribs 76 may engage other ribs of the tread 12 in other arrangements. The tread grooves 14 and ribs 76 have different components in the longitudinal and lateral directions 26, 28 along their lengths and as shown in FIG. 2 change angles once. In other embodiments, the tread grooves 14 and rib 76 can have the same components of lateral and longitudinal extensions along their entire lengths. This would result in the tread grooves 14 and ribs 76 being straight in shape although angled relative to the longitudinal direction 26. In other arrangements, the tread grooves 14 and rib 76 may curve or have two, three, four, or more angular changes along their lengths.

The ribs 76 are located between the tread grooves 14 and can extend along to and terminate at the inboard most extensions of the tread grooves 14. The ribs 76 could also be thought of as terminating at a groove that the tread grooves 14 intersect near the center of the tread 12, but such an intersecting groove is not shown in FIG. 2. Further, the rib 76 may in some embodiments extend beyond the tread grooves 14 in the lateral and longitudinal directions 28, 26 until such time as the rib 76 terminates at the nearest groove, such as that shown in FIG. 2.

The rolling tread width 42 extends from the shoulder edge 72 to shoulder edge 74 in the lateral direction 28 and is the portion of the tread 12 that engages the ground during operations of the tire 10. The rib 76 extends a large amount in the lateral direction 28. With respect to the rolling tread width 42, the rib 76 extends at least 30% of the length of the rolling tread width 42 in the lateral direction 28. As such, the rib 76 extends across at least 30% of the width of the rolling tread width 42 of the tire 10. This rib 76 design thus distinguishes it from a block or other smaller feature proximate to the shoulder edge 72. The stone ejectors 24 could be located along the entire width of the tread 12 so that they are located at most or all of the lateral locations along the rolling tread width 42 and may be at the shoulder edges 72, 74. In other embodiments, the stone ejectors 24 are spaced from the shoulder edges 72, 74 so that they are closer to the center of the tread 12. In this regard, the stone ejectors 24 may not be located at all within 5% of the rolling tread width from the shoulder edge 72, and within 5% of the rolling tread width from the shoulder edge 74.

The tread 12 is directional in that it is designed for forward rotation of the tire 10, but the tread 12 need not be directional in other exemplary embodiments. The rolling direction 32 is the direction in the longitudinal direction 26 the tread 12 is designed to rotate. The tread groove 14 extends into the tread 12 from an outer surface 16 of the tread 12 and includes a bottom surface 22 bounded on opposite sides by a leading edge wall 18 and a trailing edge wall 20. The leading edge wall 18 enters the contact patch of the tire 10 second as the tire 10 rotates in the rolling direction 32. The trailing edge wall 20 enters the contact patch of the tire 10 first before the leading edge wall 18. The bottom surface 22 may extend from the leading edge wall 18 to the trailing edge wall 20 and can open into the shoulder edge 72 and can terminate on its opposite end to the rubber of the tread 12. The tread 12 includes a stone ejector 24 that is used to help eject stones caught in the tread groove 14. Any number of the stone ejectors 24 can be present, and as shown in FIG. 2 a plurality of stone ejectors 24 are arranged on a linear segment of the tread groove 14. The stone ejectors 24 are located on the leading edge wall 18, and not the trailing edge wall 20. In some embodiments, all of the stone ejectors 24 in the tread groove 14 are located on the leading edge wall 18 or the trailing edge wall 20 such that the other wall 18, 20 does not include any of the stone ejectors 24. Placement of the stone ejectors 24 on the leading edge wall 18 has been observed by Applicants to provide the added benefit of reduction of abnormal wear of the tread 12. However, it is to be understood that other embodiments exist in which the stone ejectors 24 are instead placed onto the trailing edge wall 20 instead of the leading edge wall 18. Also, other embodiments exit in which some of the tread grooves 14 include the stone ejectors 24 on the leading edge wall 18, while other ones of the tread grooves 14 include the stone ejectors 24 on the trailing edge wall 20.

FIGS. 3-6 show various views of the tread groove 14 and the stone ejector 24 of FIG. 2. The stone ejector 24 extends from the bottom surface 22 to a height in the thickness direction 30 that is the same height as the outer surface 16. The stone ejector 24 has a top surface 63 that is at the same location in the thickness direction 30 as the outer surface 16. The top surface 63 extends some amount in the lateral direction 28 to the outer surface 16. The engagement of the top surface 63 and the outer surface 16 may be indistinguishable in that they may be molded together with no parting line or other visible indicator of differentiation. The bottom surface 22 is flat but could be concave, convex, or have any other shape in other embodiments. The trailing edge wall 20 extends upwards in the thickness direction 30 from the bottom surface 22, and the trailing edge wall 20 is oriented at an angle X 54 to the thickness direction 30. The angle X 54 is 6 degrees in some embodiments, but can be from 0 to 30 degrees in other embodiments. Further, the angle X 54 may be negative in yet other embodiments so that the tread groove 14 is a closed or partially closed tread groove 14. The leading edge wall 18 may likewise be angled relative to the thickness direction 30 and its angle to the thickness direction 30 can be the same as the angle X 54, or may be different than the angle X 54 of the trailing edge wall 20.

The stone ejector 24 features a front surface 56 that faces the trailing edge wall 20. The front surface 56 extends upwards in the thickness direction 30 from the bottom surface 22 to the top surface 63. The front surface 56 is oriented at an angle Y 58 to the thickness direction 30. The angle Y 58 may be 11 degrees in some embodiments, and in other embodiments may be from 5 degrees to 10 degrees, from 10 degrees to 15 degrees, from 15 degrees to 20 degrees, from 20 degrees to 30 degrees, or up to 45 degrees. The angle Y 58 is greater than the angle X 54. If the angle of the leading edge wall 18 is the same as angle X 54, the angle Y 58 of the front surface 56 is greater than both the angle X 54 and the angle of the leading edge wall 18.

The stone ejector 24 has a right side surface 60 that extends from the bottom surface 22 to the top surface 63 in the thickness direction 30, and that extends from the front surface 56 to the leading edge wall 18. The stone ejector 24 also has a left side surface 62 that extends from the bottom surface 22 to the top surface 63, and from the front surface 56 to the leading edge wall 18. As shown more clearly in FIG. 5, the right and left side surfaces 60, 62 have draft angles such that they are inclined relative to the thickness direction 30 such that they angle towards one another upon their extension from the bottom surface 22 to the top surface 63 in the thickness direction 30. The right and left side surfaces 60, 62 need not have these draft angles in other exemplary embodiments. The stone ejector 24 has a width 70 that extends from the right side surface 60 to the left side surface 62 and this width 70 may be measured along the length of extension of the tread groove 14. The width 70 may be the width of the front surface 56 in some embodiments.

The stone ejector 24 can be arranged so that it does not extend beyond a centerline 50 of the tread groove 14 but instead remains on only one side of the centerline 50 or at most extends up to but not beyond the centerline 50. In other embodiments the stone ejector 24 may in fact go beyond the centerline 50. In the illustrated embodiment in FIGS. 1-6 the stone ejector 24 is located completely on one side of the centerline 50. The centerline 50 is the midpoint of the tread groove 14 such that it is located an equal distance from the leading edge wall 18 and the trailing edge wall 20. The stone ejector 24 can have edges that are convex or concave in shape. As shown, the front surface 24 has a radius 64 between it and the bottom surface 22. The radius 64 extends from the right side surface 60 to the left side surface 62. The right side surface 60 has a radius 66 running along its engagement with the bottom surface 22 from the front surface 24 to the leading edge wall 18. In a similar vein, the left side surface 62 has a radius 68 from the front surface 24 to the leading edge wall 18. The radii 64, 66, 68 can be of any size and in some embodiments are 2 millimeters. In other embodiments, the radii 64, 66, 68 are from 0.5 millimeters to 2 millimeters, from 2 millimeters to 3 millimeters, from 3 millimeters to 4 millimeters, or up to 5 millimeters. The stone ejector 24 also has radii at the engagement with the leading edge wall 18. The left side surface 62 has a radius 100 that extends from the bottom surface 22 to the top surface 63 and the radius 100 is at the leading edge wall 18. The right side surface 60 has a radius 98 at the leading edge wall 18 that runs from the bottom surface 22 to the top surface 63. The radii 98, 100 can be from 0.3 millimeters to 1 millimeter in some embodiments, and may be less than the radii 64, 66, 68. In other embodiments, the radii 98, 100 may be from 1 millimeter to 2 millimeters, from 2 millimeters to 3 millimeters, from 3 millimeters to 4 millimeters, or up to 5 millimeters. Although described as having radii and rounds at the protruding edges, it is to be understood that various arrangements of the stone ejectors 24 exist in which some or all of the radii and/or rounds are not present.

The tread 12 in FIG. 2 includes a number of sipes 44 that extend from the outer surface 16 into the tread 12. The sipes 44 are shown as being linear is shape but can be variously shaped in other arrangements and have a width that is 2 millimeters or less. The sipes 44 have a width less than the tread grooves 14. The sipes 44 are arranged with respect to the stone ejectors 24 such that they do not engage the stone ejector 24 but are instead spaced therefrom. The sipes 44 engage the tread groove 14 by opening into the tread groove 14 and two of these engagement points are designated as engagement point 46 and engagement point 48 in FIG. 2. There are numerous other engagement points with the other sipes 44 in FIG. 2 as well. The engagement points 46 and 48 are not located at the stone ejector 24 but rather spaced from the stone ejector 24 and on either side of the leading edge wall 18 with the stone ejector 24 between the two engagement points 46 and 48. The stone ejector 24 is thus located on the leading edge wall 18 at a spaced between and spaced from the adjacent sipes 44 that are located at engagement points 46 and 48 on either side and spaced from the stone ejector 24 along the leading edge wall 18. In some embodiments, none of the sipes 44 engage any of the stone ejectors 24, and in yet other arrangements some or all of the stone ejectors 24 may be engaged by one or more of the sipes 44. The sipes 44 as shown do not touch the stone ejector 24 but are spaced completely from the right and left side walls 60, 62 and extend from the leading edge wall 18 to a subsequent tread groove that is identified as adjacent tread groove 96.

The pair of sipes 44, the tread groove 14 and the adjacent tread groove 96 define a block 94 of the tread 12. The stone ejector 24 engages this block 94 and may be integrally formed therewith during the molding process of the tread 12. Various blocks 94 can be formed throughout the outer surface 16 and stone ejectors 24 can engage them, or not engage them depending upon the tread 12 design. The placement of the stone ejector 24 on the leading edge of the block 94 may increase the rigidity of the block 94 under loaded rolling and minimize kick-out stresses of the block 94. Placement of the stone ejectors 24 on the leading edge wall 18, as opposed to the trailing edge wall 20, may function to reduce block kick-out stresses. However, it is to be understood that other embodiments exist in which the stone ejectors 24 are put onto the trailing edge wall 20 and not the leading edge wall 18.

Another exemplary embodiment of the tread 12 is illustrated in FIG. 7 that again includes a plurality of stone ejectors 24 along the length of the leading edge walls 18. The sipes 44 are shown as being straight in shape with a generally rectangular cross-sectional shape, but can be wavy, curved, angled or variously shaped with various cross-sectional configurations in other exemplary embodiments. The geometry in the thickness direction 30 of the sipes 44 can also vary so that the sipes 44 have different cross-sectional shapes at different ones of their depth locations in the thickness direction 30. The sipes 44 could have different depths along their lengths or along the length of the rib 76 so as to be deeper or more shallow in the thickness direction 30 at various points. The sipes 44 are shown as extending all the way from the tread groove 14 to the adjacent tread groove 96, but in other embodiments some or all of them may not engage one or both of the grooves 14 and/or 96. The plurality of sipes 44 are arranged so that they do not have the same density across the rib 76. The density is the number of sipes 44 in a given area of the rib 76 such that some locations of the rib 76 have more sipes 44 than do other locations of the rib 44. The density can be defined by the distance that successive sipes 44 are from one another such that some sipes 44 are closer to other successive sipes 44, while other sipes 44 are farther from other successive sipes 44. The sipes 44 may be arranged so that there is a higher density of sipes 44 closer to the center of the tread 12 in the lateral direction 28 and so that there is a lower density of sipes farther from the center and thus closer to the shoulder edges 72, 74 in the lateral direction 28.

Figure 7:
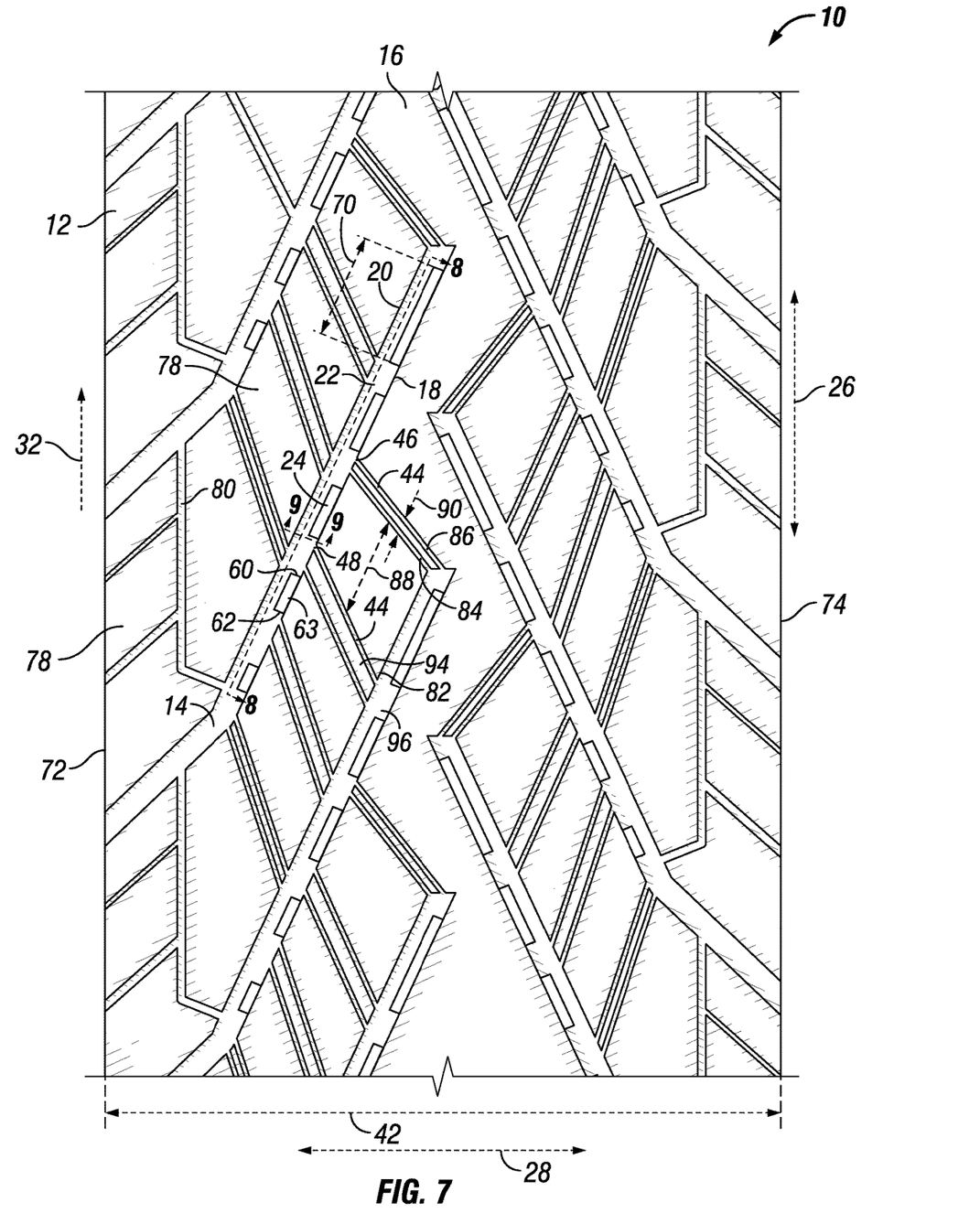
FIG. 7 is a top view of tread in accordance with another exemplary embodiment.

The plurality of sipes 44 has a first sipe 82, a second sipe 84, and a third sipe 86 that are oriented so that the third sipe 86 is closer to the center of the tread 12 in the lateral direction 28 than the first and second sipes 82, 84 in the lateral direction 28. Also, the second sipe 84 is located between the first sipe 82 and third sipe 86 along the angled rib 76. As the geometry of the sipes 44 and the rib 76 may vary, in order to determine the distances between these features, one may measure the distance from the midpoint of the sipe 44 along its length of extension. In FIG. 7, the sipes 82, 84, 86 are all oriented at angles to the grooves 14, 96 and the midpoints of the sipes 82, 84, 86 are each half way along their lengths from the tread groove 14 to the adjacent tread groove 96.

The distance from the first sipe 82 to the second sipe 84 is denoted by reference number 88, and the distance 90 is the distance from the second sipe 84 to the third sipe 86. The distances 88, 90 are measured from the midpoints of the sipes 82, 84, 86 as measured upon their extension from the tread groove 14 to the adjacent tread groove 96. The distance 88 is greater by magnitude than the distance 90. The first, second, and third sipes 82, 84, 86 are successive such that the first sipe 82 is next to the second sipe 84 with no other sipes 44 there between, and the second sipe 84 is successive to the third sipe 86 so that no other sipes 44 are between the second and third sipes 84, 86. The distance 88 can be twice the size of distance 90, or may be only slightly greater in other embodiments.

The arrangement of the three sipes 82, 84, 86 affords the rib 76 with sipes 44 that have different densities at different areas. The minimum amount of sipes 44 is three in the rib 76, but any number can be present in other embodiments. If extra numbers of sipes 76 are present then they can be spaced all the same from successive sipes 44 or may be spaced different distances from successive sipes 44. Although the tread 12 is shown with sipes 44, it is to be understood that no sipes 44 are present in other versions of the tread 12, and that the tread 12 need not have variable density sipes 44 in other embodiments.

The tread 12 also includes other features besides the stone ejectors 24 such as a shoulder block 78 that begins at, and is bounded by, the shoulder edge 72. The leading edge of the shoulder block 78 is defined by the tread groove 14. The trailing edge of the shoulder block 78 is defined by the adjacent tread groove 96. On the inboard side, the shoulder block 78 is defined by a decouple groove 80. The shoulder block 78 is located adjacent the rib 76 such that the rib 76 begins at and is bounded on its lateral outboard side by the decouple groove 80. Applicants incorporate by reference herein the following two patent applications in their entireties for all purposes that are filed on the same day as the present application the first being entitled "Average Void Depth Truck Tire with Angled Ribs Having Decoupled Shoulder Blocks" whose inventors are Brian Joseph Keefe and Daniel McEachern Hicks; and "Truck Tire with Varying Sipe Density in Angled Ribs" whose inventor Brian Joseph Keefe. Both of these applications are assigned to the assignee of the present application.

The shoulder block 78 width may be 5%, 10%, 15%, or up to 20% of the rolling tread width 42, which are percentages of the width of the tread 12 from the shoulder edge 72 to shoulder edge 74 in the lateral direction 28. The decouple groove 80 has a width that is less than the width of the tread groove 14. The widths can be the same across the lengths of these grooves 14, 80 or vary. If they vary, the widths can be calculated in any manner. For instance, the width can be the average of taking twenty evenly spaced locations along the lengths of the tread grooves 14 and decouple grooves 80. The decouple groove 80 is oriented more in the longitudinal direction 26 than in the lateral direction 28. The decouple groove 80 may extend at least twice as long in the longitudinal direction 26 than in the lateral direction 28. The decouple groove 80 is primarily linear in shape but angles at its trailing end to engage the adjacent tread groove 96. There are two sipes 44 shown in the tread block 44 that engage the shoulder edge 72 and the decouple groove 80.

The shoulder block 78, rib 76, decouple groove 80, tread groove 14 and adjacent tread groove 96 can be repeated across the entire tread 12 and in addition to being associated with the shoulder edge 72 can extend from and be associated with the shoulder edge 74. These elements can be the same as one another or may be different, and can be arranged as previously discussed so a repeat of this information is not necessary. As such, it is to be understood that the described elements of the tread 12 herein need not be located at just one particular location but can be at any area or location on the tread 12. Decoupling of the shoulder block 78 by the decouple groove 80 reduces or eliminates abnormal wear that may be present in the shoulder block 78 through the arrangements of the tread grooves 14 and rib 76. Shoulder block 78 protects the interior portion of the rib 76 which would be the portion of the rib 76 inboard from the shoulder block 78 in the lateral direction 28. The shoulder block 78 will react differently to forces imparted thereon with the presence of the decouple groove 80 and will cause the adjacent portion of rib 76 to wear more evenly. Although described as including a shoulder block 78 and decouple groove 80, it is to be understood that these features of the tread 12 are optional and, along with the variable sipe density feature previously discussed, may or may not be incorporated into designs of the tread 12 that include the stone ejectors 24.

Figure 8:
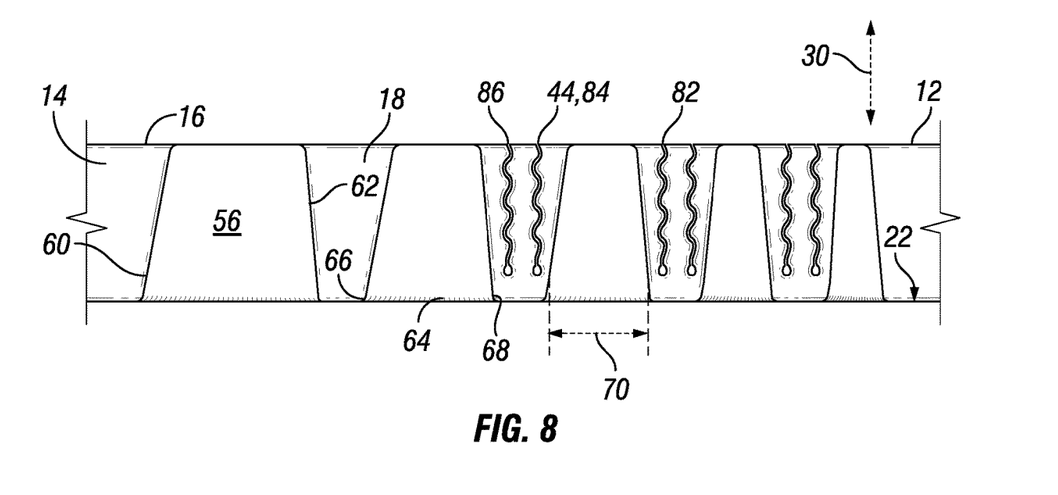
FIG. 8 is a view taken along line 8-8 of FIG. 7.
Figure 9:
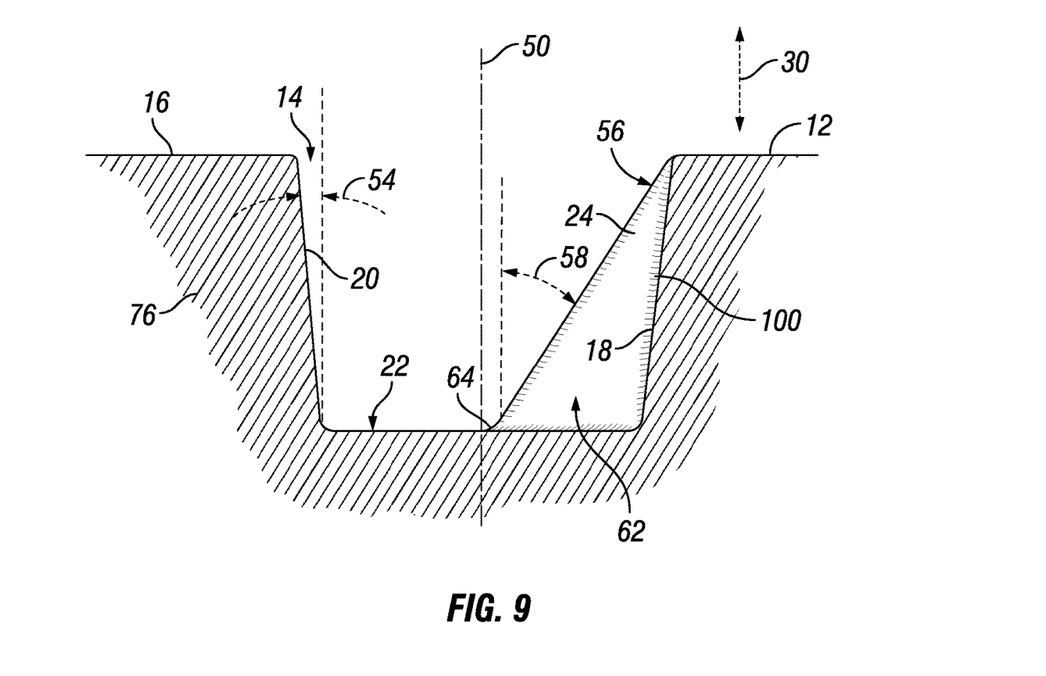
FIG. 9 is a cross-sectional view taken along line 9-9 in FIG. 7.

The design of the stone ejectors 24 in FIGS. 7-9 is different than those previously discussed. Here, the stone ejectors 24 do not have a top surface 63 but rather the front surface 56 extends up to and engages the outer surface 16 without forming the top surface 63. The front surface 56 extends across the width of the tread groove 14 to the centerline 50 but does not cross the centerline 50. The radius 64 is located at the centerline 50 and is the portion of the stone ejector 24 farthest from the leading edge wall 18. Similarities exist, for example Angle Y 58 is greater than angle X 54. In some embodiments the angle X 54 may be from 4-8 degrees, and the angle Y 58 may be from 30-50 degrees.

In other embodiments, the angle X 54 is 6 degrees, and the angle Y 58 is 11 degrees. Other versions exist in which the angle X 54 is 0 degrees, from 1-3 degrees, from 3-5 degrees, from 5-7 degrees, from 7-9 degrees, from 9-11 degrees, from 11-3 degrees, 14 degrees, or up to 15 degrees. In certain embodiments, the angle Y 58 may be 1 degree, from 1-5 degrees, from 5-10 degrees, from 10-15 degrees, from 15-20 degrees, from 20-25 degrees, from 25-30 degrees, from 30-35 degrees, from 35-40 degrees, from 40-45 degrees, from 1-10 degrees, from 10-20 degrees, from 20-30 degrees, from 30-45 degrees, or from 25-35 degrees.

The angle X 54 may be the same as the angle of the leading edge wall 18 to the thickness direction 30. The sipes 44 do not engage the stone ejectors 24, and as shown a pair of sipes 44 are located between some of the successive stone ejectors 24 such that this pair of sipes 44 engage the tread groove 14 at locations between the successive stone ejectors 24. The stone ejectors 24 in the tread groove 14 differ from one another in that successive stone ejectors 24 are wider or narrower. With reference in particular to FIG. 8, the stone ejector 24 closest to the center has a width 70 that is greater than the stone ejector 24 immediately next to it. In turn, each stone ejector 24 approaching the shoulder edge 72 has a smaller width 70 than the one previous. In some instances, successive stone ejectors 24 may have the same width. Also, although described as having decreasing widths 70 moving from the center to a shoulder edge 72, 74 of the tread 12, it may be the case that the stone ejectors 24 are arranged so that their widths 70 increase upon moving towards the shoulder edge 72, 74. However, having larger widths 70 closer to the center and then smaller widths 70 closer to the shoulder edges 72, 74 may allow water in the tread groove 14 to more easily be drained out of the shoulder edges 72, 74. It is to be understood that the widths 70 need not always be increasing or decreasing between successive stone ejectors 24. For example, 2 or more successive stone ejectors 24 could have the same width 70 and then the next stone ejector 24 could have a different width 70. In other embodiments, zones of stone ejectors 24 successive to one another can have the same width 70 and adjacent zones of stone ejectors 24 could have a different width 70. The widths 70 could be provided in any combination in the series of stone ejectors 24 in the tread groove 14.

Figure 10:
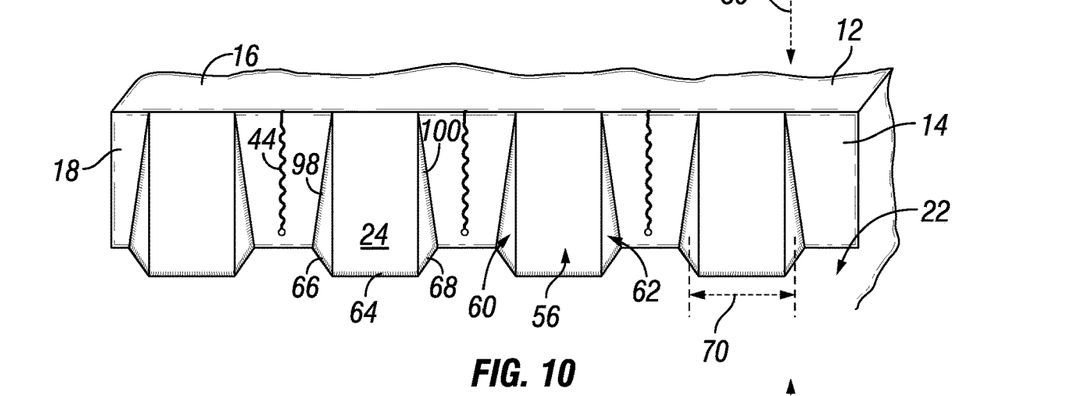
FIG. 10 is a front perspective view of a plurality of stone ejectors in a tread groove in accordance with another exemplary embodiment.

The stone ejectors 24 can be arranged in a variety of manners in accordance with different exemplary embodiments of the tread 12. FIG. 10 shows another exemplary embodiment similar to the FIGS. 7-10 embodiment in which the top surfaces 63 are not present and the front face 56 extends from the bottom surface 22 to the outer surface 16. The right and left side surfaces 60, 62 are angled relative to the front surface 56 and the widths 70 could be measured from the widest point defined between the right and left side surfaces 60, 62. The extensions of all of the stone ejectors 24 into the bottom surface 22 are similar such that the radii 64 are all located an equal distance from the leading edge wall 18.

Figure 11A:
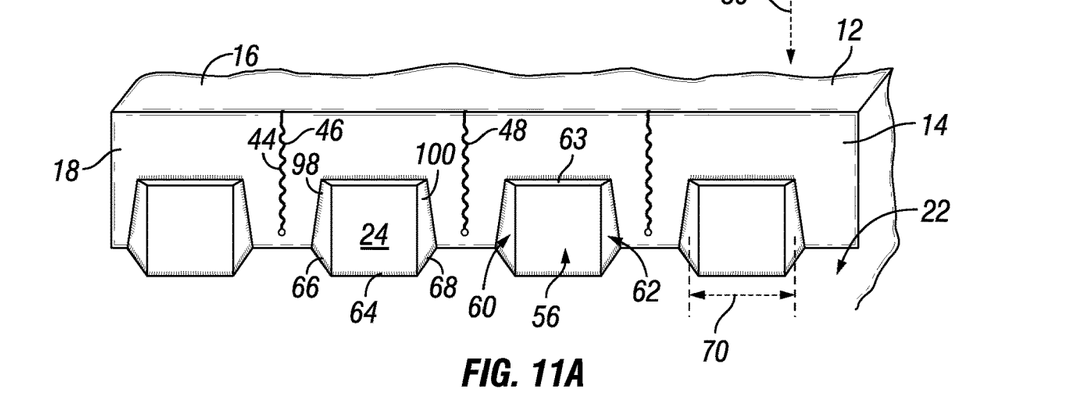
FIG. 11A is a front perspective view of a plurality of stone ejectors in a tread groove in accordance with another exemplary embodiment.
Figure 11B:
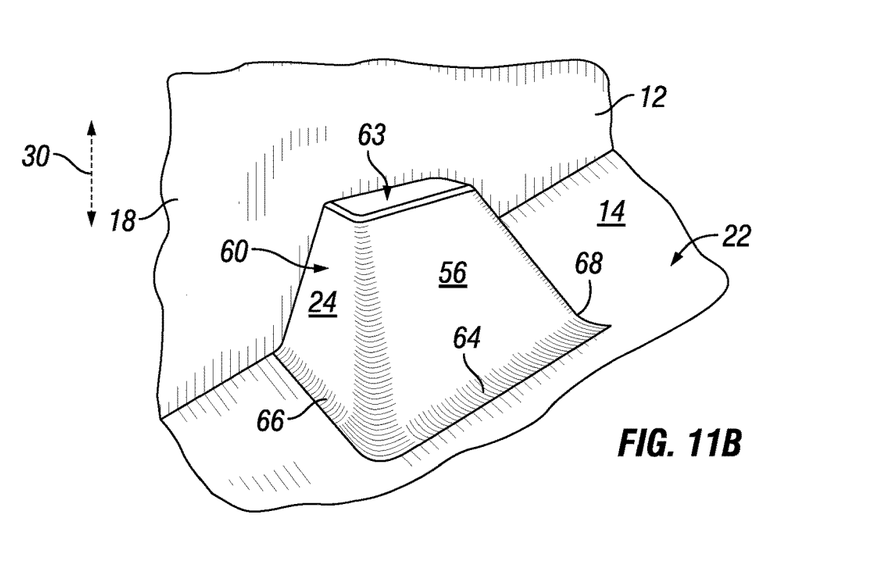
FIG. 11B is a perspective view of one of the stone ejectors of FIG. 11A.

FIG. 11A is another embodiment that has stone ejectors 24 similar to those of FIG. 10 but having top surfaces 63 on all of the stone ejectors 24 such that none of the stone ejectors 24 extend to the outer surface 16. The top surfaces 63 can be flat and are all spaced a distance from the top surface 63 in the thickness direction 30. The widths 70 of all of the stone ejectors 24 are the same. A perspective view of one of the stone ejectors 24 is shown in FIG. 11B and it can be seen that a round is present between the right side surface 60 and the front surface 56. Although not entirely visible in the figure another round is present between the front surface 56 and the left side surface 62. Radii 64, 66 and 68 are all present as well. Further, rounds can be present between the top surface 63 and the front and side surfaces 56, 60, 62.

Figure 12:
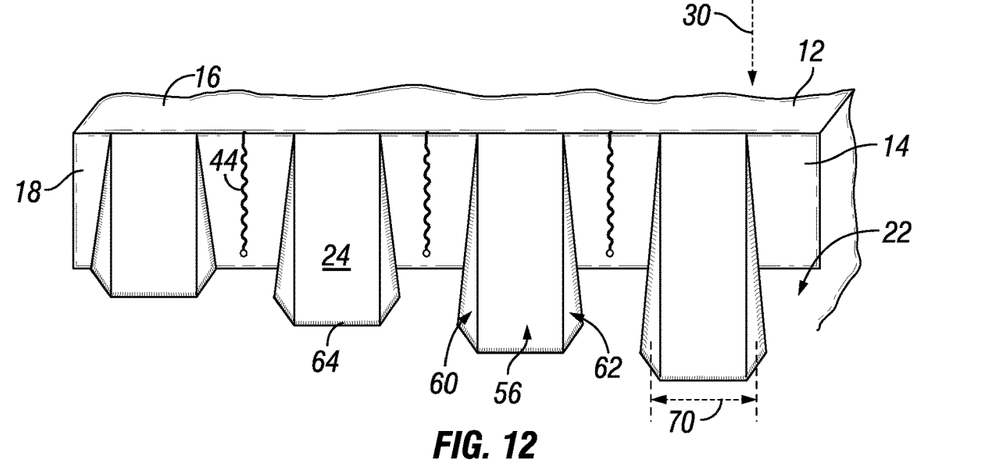
FIG. 12 is a front perspective view of a plurality of stone ejectors in a tread groove in accordance with another exemplary embodiment.

Another embodiment of the stone ejector 24 is illustrated in FIG. 12 in which the plurality of stone ejectors 24 again extend all the way up to the outer surface 16 such that a top surface 63 is not present thus having the front surface 56 extend completely from the bottom surface 22 to outer surface 16. Radii and rounds are not present in this arrangement, but the stone ejectors 24 could have them in other versions of the tread 12. Successive stone ejectors 24 are arranged so that the distance from the bottom of the front face 56 to the leading edge wall 18 changes from one stone ejector 24 to the next. In this regard, the stone ejector 24 on the left hand side of FIG. 12 extends the least amount from the leading edge wall 18 into the tread groove 14, and the next successive stone ejector 24 to its immediate right extends a distance into the tread groove 14 a greater amount. The stone ejector 24 on the right hand side of FIG. 12 extends the greatest amount into the tread groove 14 and thus is closer to the centerline 50 than any of the other stone ejectors 24. The stone ejectors 24 having the greatest extension into the tread groove 14 may be located closer to the center of the tread groove 14 and those extending the least closer to one of the shoulder edges 72, 74 so that water may be more easily removed from the tread groove 14, but it is to be understood that this could be reversed in other embodiments. The angle Y 58 will be different as per each successive stone ejector 24 since the front surface 56 is angled differently depending upon how far out into the tread groove 14 it extends. All of the stone ejectors 24 can be arranged so that each successive one increases or decreases extension into the tread groove 14 and none of them have the same amount of extension. However, it may be envisioned that in other embodiments some of the stone ejectors 24 have the same extension, and in other embodiments successive ones increase into the tread groove 14 and then decrease in extension into the tread groove 14. As such, the angle Y 56 may increase/decrease for every successive front surface 56 in the tread groove 14 so that each one of the stone ejectors 24 has a different magnitude of angle Y 56, or the angle Y 56 could be common among one or more of the front surfaces 56 of the stone ejectors 24 in the tread groove 14.

Figure 13:
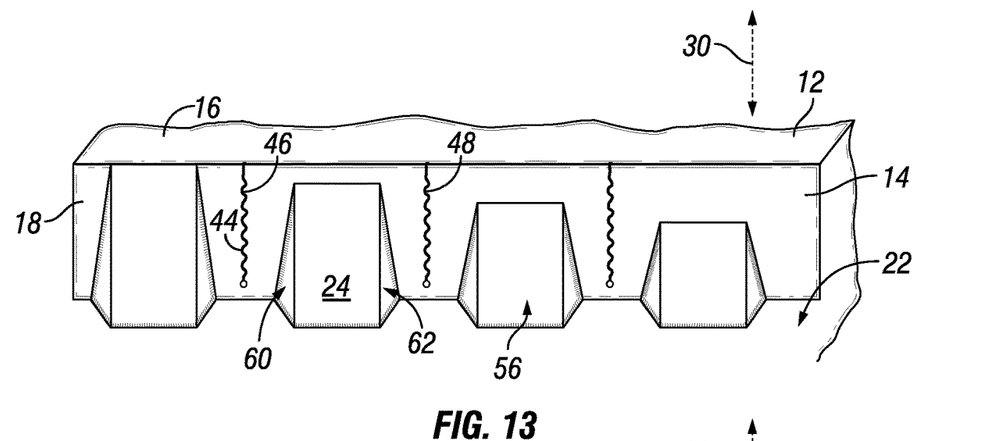
FIG. 13 is a front perspective view of a plurality of stone ejectors in a tread groove in accordance with another exemplary embodiment.

Another exemplary embodiment of the tread 12 is shown in FIG. 13 in which the top surfaces 63 are again not present. The stone ejectors 24 extend at different amounts into the tread groove 14, that is different amounts away from the leading edge wall 18, so that each successive stone ejector 24 is a different amount away and no two stone ejectors 24 extend the same amount into the tread groove 14. This embodiment is different than the others in that the stone ejector 24 closest to the leading edge wall 18 extends to the outer surface 16, but no other stone ejectors 24 extend thereto. The remaining stone ejectors 24 are spaced a distance from the outer surface 16 in the thickness direction 30. The angle Y 56 of each stone ejector 24 can be different so that no two stone ejectors 24 in the tread groove 14 have the same magnitude of angle Y 56.

Figure 14:
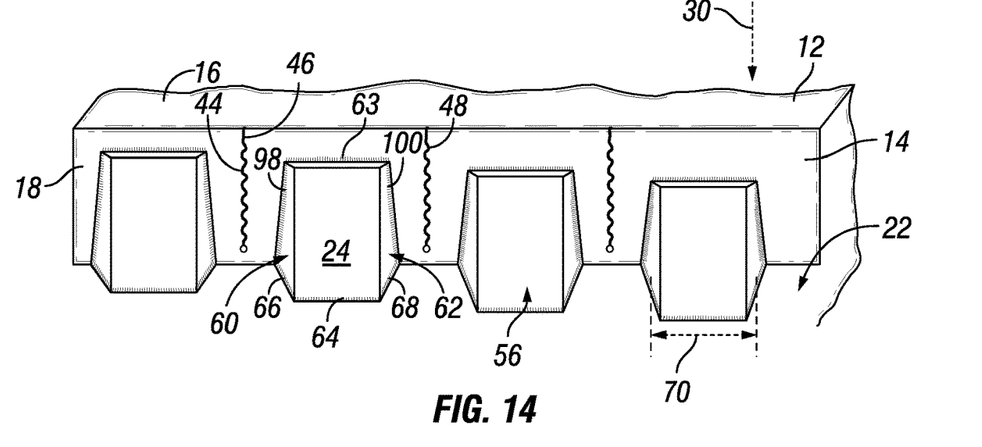
FIG. 14 is a front perspective view of a plurality of stone ejectors in a tread groove in accordance with another exemplary embodiment.

The FIG. 14 embodiment of the tread 12 includes stone ejectors 24 in the tread groove 14 that all have top surfaces 63 and that all stop short of the outer surface 16 so that all of the top surfaces 63 are spaced a distance from the outer surface 16 in the thickness direction 30. The distances of extension of the stone ejectors 24 into the tread groove 14 are also all varied so that successive ones are either longer or shorter distances into the tread groove 14 towards the centerline 50. As can be appreciated numerous variations of the stone ejectors 24 are possible as described, and features of one embodiment can be incorporated into another to yield a third embodiment. For instance, the changing widths 70 of the stone ejectors of the FIGS. 7-9 embodiment can be incorporated into the FIG. 14 embodiment to yield an embodiment where the widths 70 of successive stone ejectors 24 increase/decrease along with increasing/decreasing extensions of the stone ejectors 24 into the tread groove 14.

Figure 15:
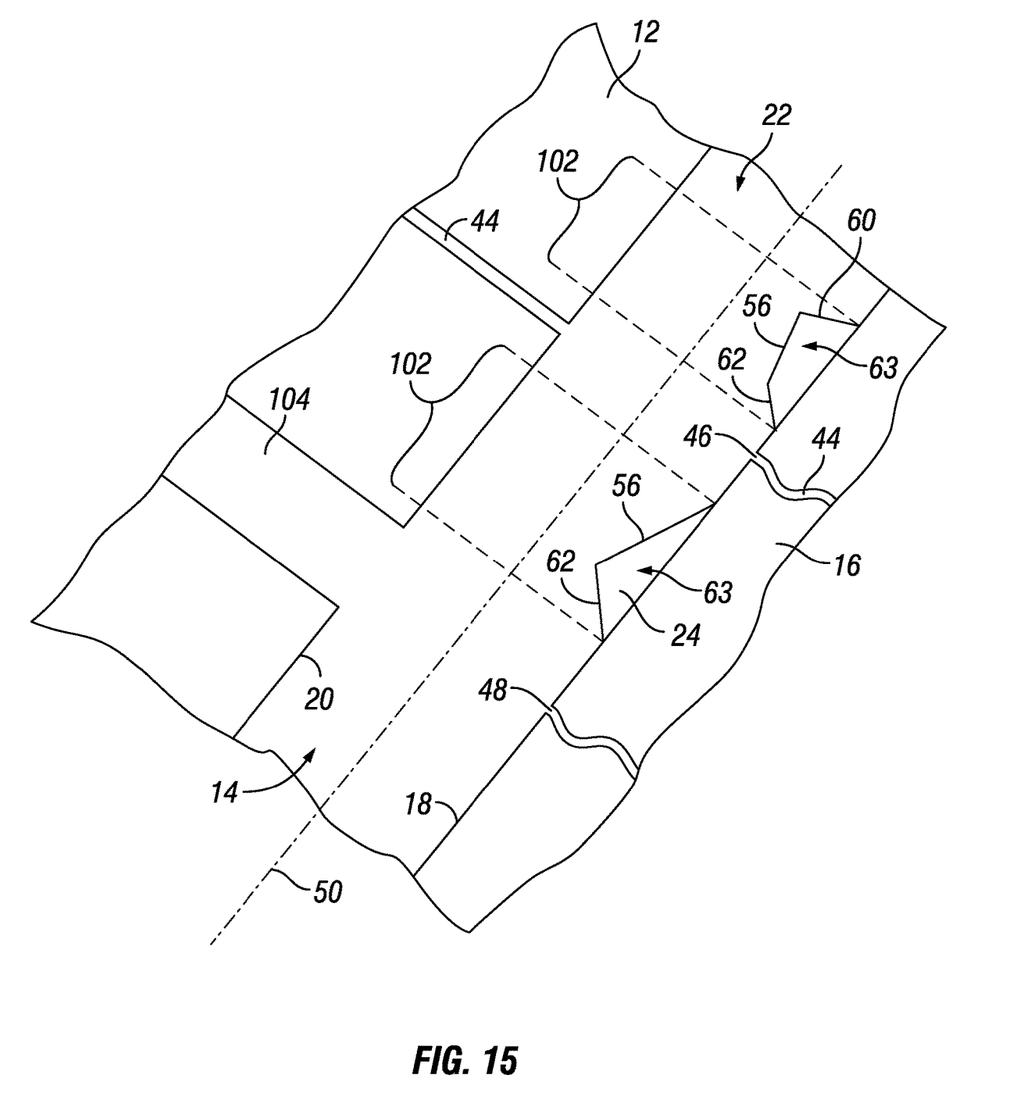
FIG. 15 is a top view of a section of a tread groove and two stone ejectors.

Certain embodiments of the tread 12 are arranged so that the stone ejectors 24 extend from one of the walls 18 or 20 and face the opposite wall 18 or 20 and do not face a groove on the opposite wall 18 or 20. In still further embodiments, the stone ejectors 24 do not face any sipes 44 on the opposite wall 18 or 20. FIG. 15 shows an alternate embodiment of the tread 12 in which grooves 104 are present, it being understood that no grooves other than the tread grooves 14 were present in the tread 12 in previously illustrated and described embodiments. FIG. 15 shows in further detail two stone ejectors 24 of one embodiment that are located on and extend from the leading edge wall 18. The trailing edge wall 20 is opposite the leading edge wall 18 and the stone ejectors 24 do not engage this opposite trailing edge wall 20. However, the stone ejectors 24 do face the opposite trailing edge wall 20. One of the illustrated stone ejectors has a top surface 63 but only two side surfaces designated as the left side surface 62 and the front surface 56, with no right side surface 60. A width 102 of the stone ejector 24 is the distance along the leading edge wall 18 that the stone ejector 24 extends, and may be the width 70 in other exemplary embodiments. The width 102 is translated to the opposite trailing edge wall 20 as denoted. If the tread groove 14 is curved or otherwise non-linear in extension, the extension of the width 102 to the trailing edge wall 20 is made so as to be at a ninety degree angle to the centerline 50. The width 102 as placed onto the trailing edge wall 20 does not engage any grooves 104 of the tread 12 and in the embodiment shown does not engage any sipes 44 of the tread 12.

The second illustrated stone ejector 24 has a top surface 63, front surface 56, right side surface 60, and left side surface 62. The width 102 of the second stone ejector 24 in FIG. 15 is the maximum extension of the second stone ejector 24 along the leading edge wall 18. The width 102 is extended to the opposite trailing edge wall 20 and there is no groove 104 engaging this extended width 102 on the trailing edge wall 20. The tread 12 may be arranged so that none of the widths 102 of the stone ejectors 24 projected onto the opposite wall encompass a groove 104 of the tread 12. In some embodiments, the tread 12 may be arranged so that none of the widths 102 of the stone ejectors 24 projected onto the opposite wall when done so encompass a groove 104 or a sipe 44 of the tread 12. The stone ejectors 24 of the FIGS. 2 and 7 embodiments face the trailing edge grooves 20 so that their widths 102 do not encompass any grooves or sipes 44. However, in other arrangements, some or all of the stone ejectors 24 could face sipes 44 such that the sipes 44 are within the widths 102 when the widths 102 are projected onto the opposite wall of the tread groove 14.

Figure 16:
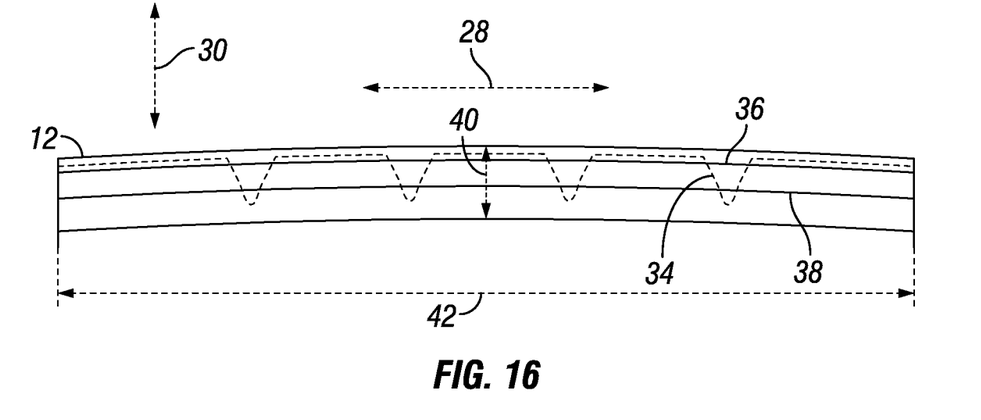
FIG. 16 is a graph of the average void depth for a tire that has four longitudinal grooves about its circumference with no angled grooves or ribs.

A typical heavy truck tire 10 with longitudinal grooves would have an average void depth 34 curve that contains portions extending from the tire tread 12 outer surface 16 to beyond 60% of the full void depth. A twenty percent line 36 and a sixty percent line 38 are illustrated and denote the location in the thickness direction 30 in which twenty percent of the thickness direction 30 height of the tread 12 would otherwise be removed from the outer surface, and in which sixty percent of the thickness direction 30 height of the tread 12 would otherwise be removed from the outer surface 16. The full void depth 40 is the distance from the outer surface 16 to a curve that is transposed in the thickness direction 30 from the outer surface 16 of tread 12 by a distance equal to the deepest point of the void of the tread 12. The twenty percent line 36 is twenty percent of the full void depth 40 down from the outer surface 16, and the sixty percent line 38 is sixty percent of the full void depth 40 down from the outer surface 16. In FIG. 16, the average void depth 34 is shown and the twenty and sixty percent lines 36, 38 are also present for reference. As shown, the tread 12 has four longitudinal grooves that extend around the entire circumference of the tread 12 in the longitudinal direction 26 and these four grooves are illustrated as the four greatest depressions, grooves in the average void depth 34. The average void depth 34 thus has portions that go past the twenty percent line 36 and that likewise go past the sixty percent line 38.

A heavy truck steer tire 10 would have an average void depth 34 curve that greatly resembles the tire tread 12 and thus the longitudinal groove shapes. A typical heavy truck drive tire with longitudinal grooves and tread blocks would have an average void depth 34 curve similar to the steer tire example but with portions that are close to the tread 12 outer surface 16. This is because the tread blocks contain lateral grooves which increase the average depth around the tire. In some instances, a drive tire may have longitudinal grooves that have a wavy or zig-zag shape, thus some component in the lateral direction 28. Nevertheless the average void depth 34 curve will still have a portion or portions that extend beyond 60% of the full void depth 40.

Figure 17:
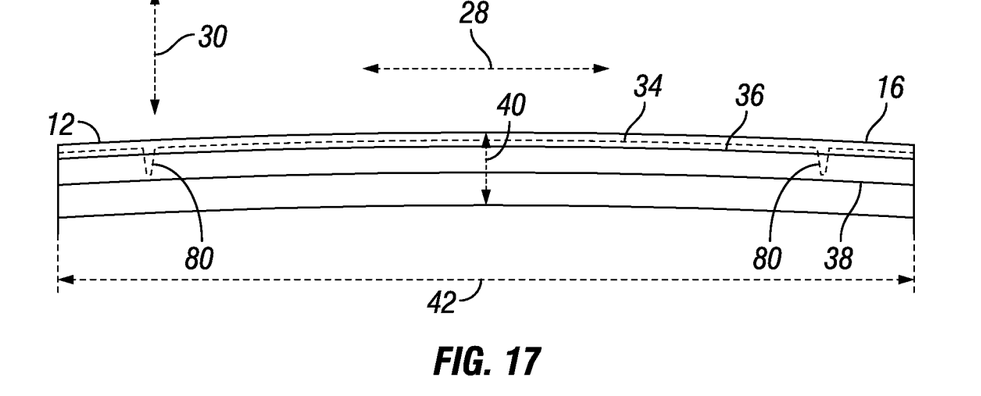
FIG. 17 is a graph of the average void depth for a tire that has angled grooves and ribs and a pair of decoupled grooves.

FIG. 17 shows an average void depth 34 for a tread 12 that has angled tread grooves 14 and ribs 76. A heavy truck tire 10 with the angled tread grooves 14 and ribs 76 has an average void depth 34 curve that is relatively flat and does not extend more than 20% of the full void depth 40. As such, the average void depth 34 does not go past the twenty percent line 36. There is an exception to this rule in that if the tread 12 includes one or more decoupled grooves 80, then the average void depth 34 would extend past the twenty percent line 36. Decoupled grooves 80 are grooves that extend primarily in the longitudinal direction 26 and function to decouple a shoulder block 78 of the tread 12 from an adjacent rib or other feature as discussed. Therefore, there may be decouple grooves 80 on either side of the tread 12 to decouple the shoulder blocks 78 on either side of the tread 12. The decouple grooves 80 do not count for purposes of the average void depth 34 going past the twenty percent line 36 and thus are ignored in FIG. 17. As such, it is to be understood that as defined herein the average void depth 34 does not include decouple grooves 80. Further, the average void depth 34 outboard of the two decoupled grooves 80 to the tread edges in the lateral direction 28 could likewise extend past the twenty percent line 36 due to openings being present in the tread 12 at these locations. The rest of the average void depth 34 as shown in FIG. 17 does not go past the twenty percent line 36.

In some instances, large openings may be present at and extending inboard from the shoulder edges 72 and 74 which may thus function to cause the average void depth 34 to go below the twenty percent line 36 when measured. However, due to the presence of the decoupling grooves 80, the average void depth 34 is measured from one decoupling groove 80 to the other in the lateral direction 28, and the average void depth 34 at the decoupling grooves 80 and of the tread 12 outboard of the decoupling grooves 80 in the lateral direction 28 are not counted. When described herein as being "outboard" of the decoupling groove 80, it is to be understood that the decoupling grooves 80 are positioned next to shoulder edges 72, 74 and are thus generally disposed on opposite sides of the tread 10 in the lateral direction 28. The "outboard" portion of the tread 10 are those portions of the tread 10 immediately adjacent the decoupling grooves 80 and extending outboard in the lateral direction 28. In effect, the outboard portion of the tread 10 from one of the decoupling grooves 80 is the shoulder bock 78 defined by that particular decoupling groove 80 or portions of the tread 10 right next to and outboard of the decoupling groove 80 and not across the centerline of the tread 10 in the lateral direction 28.

The description of the tread 10 with respect to the average void depth 34 can also be defined in another manner. The tread 10 can have a centerline in the lateral direction 28, which in effect splits the tread 10 up into a left half and a right half. The average void depth 34 of the tread 10 does not go past the twenty percent line 36 inboard from the decouple groove 80 in the lateral direction 28 to the centerline. The average void depth 34 could go past the twenty percent line 36 at the decouple groove 80 and/or outboard of the decouple groove 80 in the lateral direction 28 to the shoulder edge 72 or 74 (depending on which side of the tread 10 the decouple groove 80 is positioned). In this regard, the average void depth 34 inboard of the decouple grooves 80 does not go past the twenty percent line 36, while the average void depth 34 at and/or outboard of the decouple grooves 80 may or may not go past the twenty percent line 36.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. A heavy truck tire tread, comprising:
   a longitudinal direction, a lateral direction, and a thickness direction, wherein the tread has a rolling direction that is in the longitudinal direction;
   a tread groove that is not oriented completely in the longitudinal direction so as to extend in both the longitudinal direction and the lateral direction, wherein the tread groove extends in the thickness direction from an outer surface of the tread, wherein the tread groove is at least partially defined by a leading edge wall and a trailing edge wall and a bottom surface;
   a plurality of stone ejectors engaging either the leading edge wall or the trailing edge wall but not both the leading edge wall and the trailing edge wall, wherein the stone ejectors face a continuous uninterrupted section of the non-engaged leading edge wall or the trailing edge wall, and wherein the non-engaged leading edge wall or the trailing edge wall is free from engagement with any of the plurality of stone ejectors or any other stone ejectors;
   wherein the tread has an average void depth that does not go past a twenty percent line, wherein the twenty percent line is twenty percent of a full void depth located from the outer surface of the tread, wherein the average void depth does not include decouple grooves;
   wherein successive stone ejectors in the tread groove have increasing widths such that all of the successive stone ejectors within the tread groove have continuously increasing widths from each one of the stone ejectors to the next successive one of the stone ejectors and none of the stone ejectors within the tread groove have the same width.

2. The tread as set forth in claim 1, wherein the stone ejectors engage the leading edge wall and do not engage the trailing edge wall, and wherein the stone ejectors face the non-engaged trailing edge wall.

3. The tread as set forth in claim 1, further comprising a plurality of sipes that extend in the thickness direction from the outer surface of the tread, wherein the plurality of sipes engage the leading edge wall and the trailing edge wall, and wherein the stone ejectors are free from engagement with the plurality of sipes such that the plurality of sipes do not engage the tread groove at the stone ejectors.

4. The tread as set forth in claim 3, wherein two successive ones of the plurality of sipes engage the tread groove at engagements points such that one of the stone ejectors is located between and spaced from the engagement points, wherein the two successive ones of the plurality of sipes extend to an adjacent tread groove such that the tread groove, the adjacent tread groove, and the two successive ones of the plurality of sipes define a block.

5. The tread as set forth in claim 1, wherein the stone ejectors are located at the outer surface of the tread in the thickness direction and extend from the outer surface of the tread to the bottom surface.

6. The tread as set forth in claim 1, wherein the stone ejectors are spaced from the outer surface of the tread in the thickness direction and do not extend from the outer surface of the tread, wherein the stone ejectors are located at the bottom surface.

7. The tread as set forth in claim 1, wherein the tread groove has a centerline located an equal distance from the leading edge wall and the trailing edge wall that extends along a length of the tread groove, wherein the stone ejectors do not extend past the centerline.

8. The tread as set forth in claim 1, wherein one of the stone ejectors has a front surface that faces the non-engaged leading edge wall or the trailing edge wall, wherein the non-engaged leading edge wall or the trailing edge wall is oriented at an angle X to the thickness direction, wherein the front surface is oriented at an angle Y to the thickness direction, wherein angle Y is greater than angle X.

9. The tread as set forth in claim 1, wherein one of the stone ejectors has a front surface that faces the non-engaged leading edge wall or the trailing edge wall, wherein the stone ejector has a right side surface and a left side surface that extend from the front surface to the engaged leading edge wall or trailing edge wall;
   wherein the front surface, the right side surface, and the left side surface each have a radius to the bottom surface;
   wherein the right side surface and the left side surface each have a radius to the engaged leading edge wall or trailing edge wall.

10. The tread as set forth in claim 9, wherein the radii to the bottom surface are all 2 millimeters; and
    wherein the radii to the engaged leading edge wall or trailing edge wall are all 0.3-1 millimeters.

11. The tread as set forth in claim 1, wherein the stone ejectors all have a front surface that faces the non-engaged leading edge wall or the trailing edge wall, wherein the front surfaces are oriented at different angles Y to the thickness direction such that successive stone ejectors have an increasing angle Y.

12. The tread as set forth in claim 1, wherein the stone ejectors all have a left side surface and a right side surface and a width that extends from the left side surface to the right side surface, wherein successive stone ejectors have increasing widths.

13. The tread as set forth in claim 1, wherein the tread has a rolling tread width that extends in the lateral direction between a pair of shoulder edges of the tread, wherein all of the plurality of the stone ejectors are not in the shoulder of the tread such that all of the plurality of the stone ejectors are spaced at least 5% of the rolling tread width from both of the pair of shoulder edges in the lateral direction.

14. The tread as set forth in claim 1, further comprising:
    a rib adjacent the tread groove;
    a shoulder block adjacent the rib and at a shoulder edge of the tread;
    a decouple groove that decouples the shoulder block from the rib, wherein the decouple groove is spaced from and free from engagement with the shoulder edge of the tread, wherein the decouple groove extends at least twice as long in the longitudinal direction than in the lateral direction, wherein a width of the decouple groove is less than a width of the tread groove;
    a plurality of sipes located in the rib, wherein the plurality of sipes has a first sipe, a second sipe and a third sipe, wherein the second sipe is between the first sipe and the third sipe;
    wherein the first sipe, the second sipe and the third sipe are successively arranged;
    wherein the distance from the first sipe to the second sipe is different than the distance from the second sipe to the third sipe.

15. A heavy truck tire that has the tread of claim 1.

16. A heavy truck tire tread, comprising:
    a longitudinal direction, a lateral direction, and a thickness direction, wherein the tread has a rolling direction that is in the longitudinal direction;
    a tread groove that is not oriented completely in the longitudinal direction so as to extend in both the longitudinal direction and the lateral direction, wherein the tread groove extends in the thickness direction from an outer surface of the tread, wherein the tread groove is at least partially defined by a leading edge wall and a trailing edge wall and a bottom surface;
    a stone ejector engaging either the leading edge wall or the trailing edge wall but not both the leading edge wall and the trailing edge wall, wherein the stone ejector faces the non-engaged leading edge wall or the trailing edge wall;
    wherein the tread has an average void depth that does not go past a twenty percent line, wherein the twenty percent line is twenty percent of a full void depth located from the outer surface of the tread, wherein the average void depth does not include decouple grooves;
    wherein a plurality of the stone ejectors are present in the tread groove and all engage the same one of the leading edge wall or the trailing edge wall but not both the leading edge wall and the trailing edge wall, wherein the stone ejectors all have a left side surface and a right side surface and a width that extends from the left side surface to the right side surface, wherein successive stone ejectors have increasing widths such that all of the successive stone ejectors within the tread groove have continuously increasing widths from each one of the stone ejectors to the next successive one of the stone ejectors and none of the stone ejectors within the tread groove have the same width.

17. The tread as set forth in claim 16, further comprising a shoulder edge that is engaged by the tread groove, wherein a centerline of the tread is spaced from the shoulder edge in the lateral direction, wherein the plurality of successive stone ejectors are arranged to have the continuously increasing widths in the lateral direction from the shoulder edge to the centerline.

* * * * *